United States Patent [19]
Liebler

[11] Patent Number: 5,697,070
[45] Date of Patent: Dec. 9, 1997

[54] BATTERY PACK FOR PORTABLE TRANSCEIVER

[75] Inventor: Charles Frederick Liebler, Holmdel, N.J.

[73] Assignee: Lucent Technologies, Inc., Murray Hill, N.J.

[21] Appl. No.: 463,817

[22] Filed: Jun. 5, 1995

[51] Int. Cl.⁶ .................................................. H04B 1/38
[52] U.S. Cl. ........................... 455/90; 455/89; 379/428; 320/2; 439/928; 439/500; 429/97
[58] Field of Search .......................... 429/97, 100, 123; 439/928, 500; 379/428, 433; 455/89, 90, 128, 346, 347, 348, 349; 320/2

[56] References Cited

U.S. PATENT DOCUMENTS

| | | | |
|---|---|---|---|
| D. 305,427 | 1/1990 | Soren et al. | D14/138 |
| D. 305,717 | 1/1990 | Soren et al. | D8/13 |
| 3,728,664 | 4/1973 | Hurst | 339/91 R |
| 4,578,628 | 3/1986 | Siwiak | 320/2 |
| 4,904,549 | 2/1990 | Goodwin et al. | 429/97 |
| 5,317,247 | 5/1994 | Chong et al. | 320/2 |
| 5,396,162 | 3/1995 | Brilmyer | 320/2 |
| 5,460,906 | 10/1995 | Leon et al. | 429/97 |
| 5,535,437 | 7/1996 | Karl et al. | 455/90 |

FOREIGN PATENT DOCUMENTS 9216057  9/1992  WIPO.

Primary Examiner—Reinhard J. Eisenzopf
Assistant Examiner—Lee Nguyen
Attorney, Agent, or Firm—Samuel R. Williamson

[57] ABSTRACT

A battery pack provides ease of assembly and disassembly from a portable transceiver yet retains its new-like latching properties for an extended period of time. The battery pack is generally rectangular in shape and includes alignment slots and a projecting rib section on one edge surface for aligning both with counterpart projecting ribs and an alignment slot located on the housing of the portable transceiver. The battery pack also includes a latch mechanism attached to a generally planar surface on the battery housing for securing the battery housing to the housing of the portable transceiver. The latch mechanism includes both an outwardly projecting guide member for guiding the battery pack into a cradle on the portable transceiver and a latch member within the perimeter of the outwardly projecting guide member for securing the battery pack to the portable transceiver. The snap member, the alignment slots and the projecting rib advantageously provide the total restraint for securing the battery housing to the housing of the portable transceiver.

15 Claims, 3 Drawing Sheets

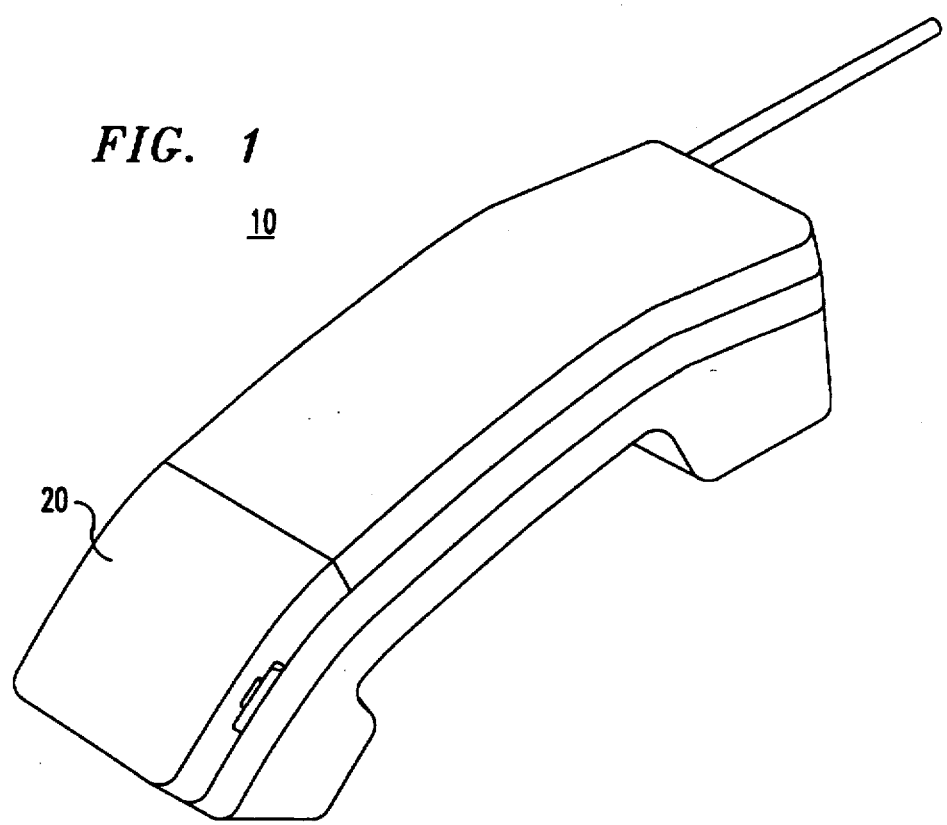
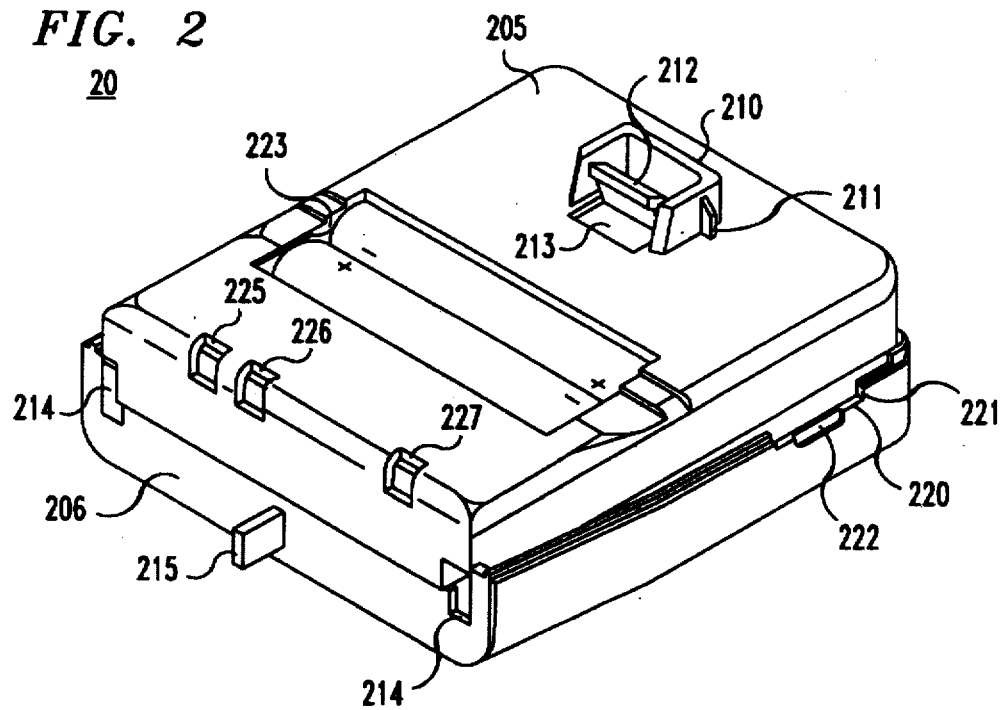

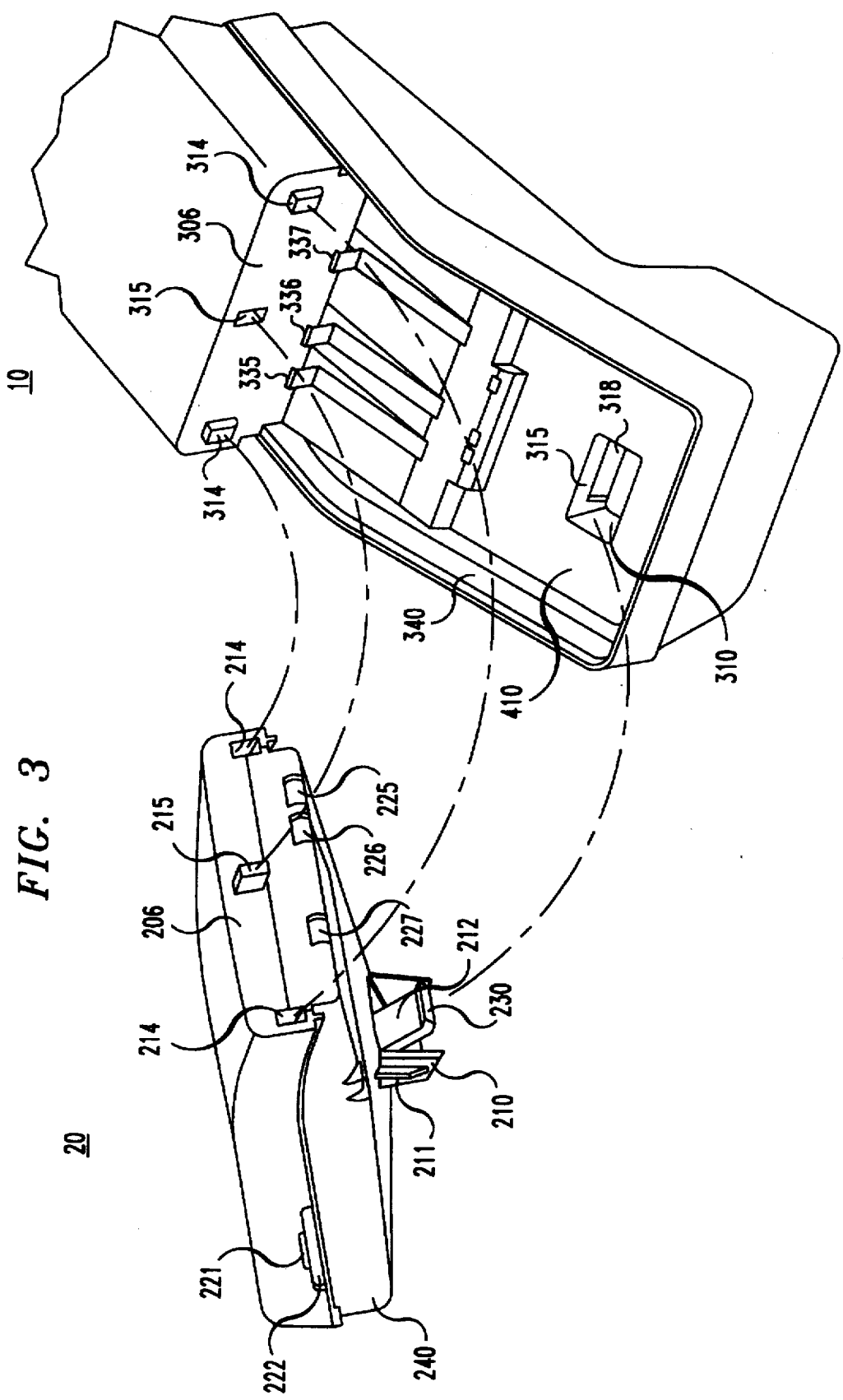

BATTERY PACK FOR PORTABLE TRANSCEIVER

BACKGROUND OF THE INVENTION

1. Technical Field

This invention relates to battery packs and, more particularly, to latching mechanisms incorporated in battery packs for coupling the battery packs to a portable device.

2. Description of the Prior Art

Battery packs which provide a portable source of power for portable devices are presently available in the art. These battery packs advantageously incorporate a plurality of batteries in a housing and provide common output power ports for powering various portable devices such as portable transceivers. Once the battery pack is discharged, the portable device is typically transported to a charging station where the battery pack is recharged while still connected to the portable device. While the battery pack is being recharged, the portable device usually remains cradled in the charging station and is often not available for use during this charging period. Since it is not always convenient to transport the portable device to a charging station or even to leave it there while the battery pack is being recharged, in some known arrangements and as an alternative, the battery pack is removed and replaced with a freshly charged spare battery pack. This requires frequent battery pack changes, however, which over time will affect the structural security with which the latching mechanisms affix the battery pack to the portable device. Thus, it would be desirable for latching mechanisms employed in a portable device and an associated battery pack to retain their like-new latching properties after many engagements and disengagements of the battery pack, yet still provide ease of assembly and disassembly of this battery pack from the portable device for a user.

SUMMARY OF THE INVENTION

A battery pack configured in accordance with the principles of the invention provides ease of assembly and disassembly from a portable device such as a transceiver yet retains its new-like latching properties for an extended period of time.

The battery pack is generally rectangular in shape and includes alignment slots and a projecting rib section on one edge surface for aligning both with counterpart projecting ribs and an alignment slot located on the housing of the portable transceiver. The battery pack also includes a latch mechanism attached to a generally planar surface on the battery housing for securing the battery housing to the housing of the portable transceiver. The latch mechanism includes both an outwardly projecting guide member for guiding the battery pack into a cradle on the portable transceiver and a latch member within the perimeter of the outwardly projecting guide member for securing the battery pack to the portable transceiver. The snap member, the alignment slots and the projecting rib advantageously provide the total restraint for securing the battery housing to the housing of the portable transceiver.

BRIEF DESCRIPTION OF THE DRAWING

The invention and its mode of operation will be more clearly understood from the following detailed description when read with the appended drawing in which:

FIG. 1 is a perspective view of a portable transceiver which incorporates a battery pack, in accordance with the invention;

FIG. 2 is an illustration of the details of the latching mechanisms for interconnecting the battery pack to the portable transceiver, shown in FIG. 1, in accordance with the invention;

FIG. 3 shows details of a cradle portion of the portable transceiver and the battery pack in positional alignment for inserting in this cradle portion of the portable transceiver, in accordance with the invention.

Throughout the drawing, the same elements when shown in more than one figure are designated by the same reference numerals.

DETAILED DESCRIPTION

Figure 4:
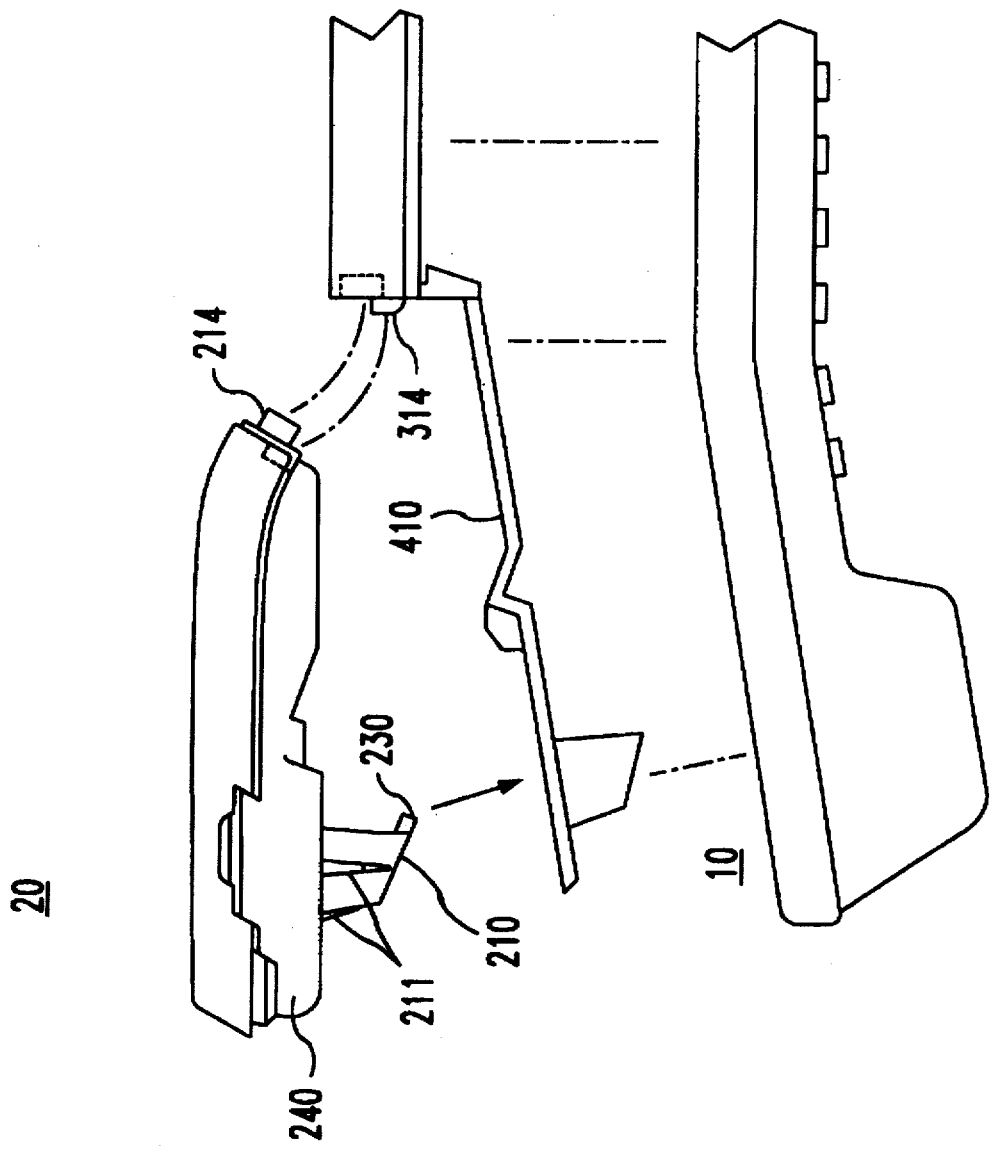
FIG. 4 shows additional details of the cradle portion of the portable transceiver and the battery pack in positional alignment for inserting in this cradle portion of the portable transceiver, in accordance with the invention.

FIG. 1 is a perspective view of a portable transceiver or telephone handset 10 which incorporates a battery pack 20 suitable for use in said handset in accordance with the invention. Such a portable transceiver as handset 10 is also shown in U.S. Des. Patent 332,610 which issued to S. Alimet al. on Jan. 19, 1993. The battery pack 20 appears generally as a rectangular slab. It forms a continuation of the handset housing design and maintains the appearance of a family of similarly configured portable handset units.

FIG. 2 provides an illustration of the details of the latching mechanisms for interconnecting the battery pack 20 to the telephone handset 10, shown in FIG. 1. Included on a generally flat back planar surface 205 of the battery pack 20 is an outwardly projecting u-shaped guide detail 210 which facilitates the placement of the battery pack 20 onto the handset unit 10. Three upstanding ribs 211 (only one is shown) are affixed to each one of the outwardly projecting surfaces forming the u-shaped guide detail 210. Also included on the battery pack 20 within the perimeter of the u-shaped guide detail 210 is an outwardly extending molded cantilevered retention snap member 212. In molding this retention snap member 212, an opening 213 is made in the surface 205 of the battery pack 20.

On an edge surface 206, which extends in a direction generally orthogonal to the back planar surface 205 of the battery pack 20, are two alignment openings or slots 214 and an elongated protrusion or alignment rib 215 interposed between the two alignment slots 214. To aid in removal of the battery pack 20 from the telephone handset 10, a combination flesh-hook/coin slot 220 is provided on opposite sides (only one is shown) of the battery pack. These flesh-hook/coin slots 220 permit a person to easily dislodge the battery pack 20 from the telephone handset 10. In operation, a person may position a coin in the slot 221 and rotate the coin which causes the battery pack 20 to be separated from the telephone handset 10. As an alternative, a person desiring to remove the battery pack may grip the battery pack 20 in the vicinity of the coin slot 221 and also the flesh hook 222 with, for example, the thumb and third finger of one hand and grip the handset 10 in the other hand. By exerting an upward rotating motion on the battery pack 20 away from the handset 10, this upward rotating motion being about the alignment slots 214 and the alignment rib 215, the battery pack 20 is easily rotated away from and removed from the housing of the handset 10.

The back planar surface 205 includes a rectangular opening 223 through which two of the individual battery cells are visible. This opening provides clearance between the battery pack 20 and a shelf member 410 in the telephone handset housing, as seen in greater detail in FIG. 4, described later herein.

Even though the disclosed arrangement facilitates removal and insertion of the battery pack 20 into the handset 10, operation of the handset is such that this unit may also be cradled in a charging station (not shown) for charging the battery pack 20 directly. At the juncture of the back planar surface 205 and the edge surface 206 of the battery pack 20 are located recessed electrical contacts 225, 226, and 227. Contacts 225 and 226 are shorted together within the battery pack 20. Contact 225 mates directly with the unregulated positive supply voltage in the charging station or base unit via a pass-through conductor in the telephone handset 10. Such a base unit suitable for use as a charging station with telephone handset 10 is described in U.S. Pat. No. 5,371,784 which issued to P. Yankura on Dec. 6, 1994.

The wiring in the handset 10 is arranged such that even though the handset 10 is cradled in the base unit, no supply voltage from the base unit reaches the circuitry in the handset 10 as long as the battery pack 20 is removed. This advantageously prevents the supply voltage from the base unit, which may be unregulated, from being applied directly to electronic circuitry in the handset 10. The battery pack provides some measure of filtering and regulation for the supply voltage. Contact 226 provides the positive regulated voltage source to the telephone handset 10 when the battery pack is positioned in the handset. Contact 227 is the negative contact for the battery pack 20.

Referring next to FIG. 3, there is shown details of a cradle portion of the telephone handset housing and the battery pack 20 in positional alignment for inserting in this cradle portion of the telephone handset 10.

For inserting the battery pack 20 into the handset housing, the two alignment slots 214 and center rib 215 located on the battery pack 20 mate with their counterparts of two elongated protrusions or alignment ribs 314 and a center slot 315 located on the upstanding surface 306 of the handset housing. Center rib 215 is made slightly longer than alignment ribs 314 to facilitate the initial aligning of the battery pack with the housing of the telephone handset 10.

The battery pack 20 is assembled to the housing of the telephone handset 10 by inserting the center rib 215 on one end of the battery pack 20 into the housing alignment slot 315 and pivoting or rotating the opposite end of the battery pack 20 downward into the handset housing. At the same time that the rib 215 is aligned with and inserted into the alignment slot 315, the alignment slots 214 also align with and receive the ribs 314 on the handset housing.

The battery pack 20 is self locating by means of the u-shaped guide detail 210 that mates with a cavity 310 molded into the handset housing. During insertion of the battery pack 20, the front edge 230 of the cantilevered retention snap member 212 is deflected slightly backward by the vertical surface 315 of the cavity 310 as this snap member 212 travels downward in this cavity. Once the snap member 212 reaches an opening 318, the front edge 230 of this retention snap member 212 snaps forward into this opening and engages a stop surface at the top of this opening thereby securing the battery pack 20 to the telephone handset 10. The interaction between 1) the cantilevered retention snap member 212 and the cavity 310, 2) the alignment slots 214 and alignment ribs 314, and 3) the center alignment slot 315 and the alignment rib 215 combine to securely attach the battery pack 20 to the telephone handset 10. A lower perimeter sidewall 240 of the battery pack 20 is nested into an upwardly extending ridge 340 when the battery pack 20 is fully inserted into the housing of the telephone handset 10.

The latching mechanisms employed in the telephone handset 10 and the associated battery pack 20 are arranged to retain their latching properties after many engagements and disengagements of the battery pack, yet still provide ease of assembly and disassembly of this battery pack for a user. In that there will inevitably be some degradation over time through continuous use of some parts of the latching mechanisms, in accordance with the disclosed embodiment, those latching mechanisms which encounter the greater stress and thereby tend to degrade the most through use are installed on the battery pack since this unit will more likely have exhausted its useful life and be replaced before the telephone handset 10. Also, in further accordance with the disclosed embodiment, those latching mechanisms on the handset 10 which contact the battery pack 20 are ruggedized to withstand the repeated insertions and removals of the battery pack 20. By way of illustrative example, the u-shaped guide detail 210, that mates with the cavity 310 in the handset 10 is of a somewhat softer and more pliable plastic material, such as commonly available Acrylonitrile-Butadiene-Styrene (ABS) material, than the harder material comprising the cavity 310. The harder material employed in the cavity 310 is typically an Acrylonitrile-Butadiene-Styrene/Polycarbonate (ABS/PC) blend. The softer ABS material is also employed in the upstanding ribs 211 affixed to each surface of the u-shaped guide detail 210, these upstanding ribs 211 butting against the sidewalls of the cavity 310 when the battery pack 20 is engaged in the telephone handset 10.

As the battery pack 20 is pivoted into the handset housing, a wiping action occurs between the recessed contacts 225, 226 and 227 on the battery pack 20 and their respective mating contacts 335, 336 and 337 located in the handset housing. This wiping action aids in assuring that suitable electrical contact will be established between the handset and the battery pack connectors. The contacts in the battery pack 20 are recessed to prevent accidental shorting between the positive and negative contacts when the battery pack 20 is out of the handset or a suitably configured charger station. There is also contained within the battery pack 20 housing an over-current device so that in the unlikely event that the terminals become shorted to ground or some circuit component shorts out, this over-current device will activate and interrupt the current from the battery pack.

FIG. 4 shows additional details of the cradle portion of the telephone handset housing and the battery pack 20 in positional alignment for inserting in this cradle portion of the telephone handset 10. The battery pack 10 is inserted into a shelf member 410 which, in turn, is seated in the cradle of the telephone handset 10, this cradle being better illustrated in FIG. 3.

Various other modifications of this invention also are contemplated and may obviously be resorted to by those skilled in the art without departing from the spirit and scope of the invention as hereinafter defined by the appended claims.

The invention claimed is:

1. A generally rectangular shaped battery housing for a portable transceiver, the battery housing comprising:

guide means for aligning said battery housing in a cradle in the housing of the portable transceiver, the guide means including at least two openings in an edge surface and a first elongated protrusion generally interposed between said two openings on said edge surface; and a latch mechanism attached to a generally planar surface on the battery housing for attaching the battery housing to the housing of the portable transceiver, said planar surface extending in a direction generally orthogonal to the first edge surface, said latch mechanism including an outwardly projecting guide member and a latch member within the perimeter of the outwardly projecting guide member.

2. The battery housing of claim 1 wherein the outwardly projecting guide member is a generally u-shaped member for guiding the battery pack into a nested position in the cradle of the housing of the transceiver by extending into a cavity in the housing of the portable transceiver, said u-shaped member extending in a direction generally orthogonal to said planar surface.

3. The battery housing of claim 2 wherein the latch member is a cantilevered retention snap member having a catch surface for securing the battery pack in the portable transceiver, said snap member being engaged when said catch surface butts against a stop surface in said cavity.

4. The battery housing of claim 3 wherein the first elongated protrusion is inserted in an alignment opening in the housing of the portable transceiver.

5. The battery housing of claim 4 wherein said at least two openings respectively engage a second and a third elongated protrusion, said second and third elongated protrusion being located on an upstanding surface in the cradle of the housing of the portable transceiver, and said first elongated protrusion having a length greater than said second and third elongated protrusion.

6. The battery housing of claim 5 wherein the snap member, said at least two openings and said first elongated protrusion provides the total restraint for securing the battery housing in the housing of the portable transceiver.

7. The battery housing of claim 1 wherein said battery housing is constructed of a plastic material having a hardness that is less than the material of which said portable transceiver housing is constructed.

8. The battery housing of claim 7 wherein said plastic material in said battery housing is an ABS type material.

9. The battery housing of claim 8 wherein said plastic material in said portable transceiver housing is an ABS/PC type material.

10. A method of securing a battery housing in a portable transceiver, the method comprising the steps of:

providing guide members on the battery housing for aligning said battery housing in a cradle in the housing of the portable transceiver, the guide members including at least two openings in an edge surface and a first elongated protrusion generally interposed between said two openings on said edge surface; and providing a latch mechanism attached to a generally planar surface on the battery housing for attaching the battery housing to the housing of the portable transceiver, said planar surface extending in a direction generally orthogonal to the first edge surface, said latch mechanism including an outwardly projecting guide member and a latch member within the perimeter of the outwardly projecting guide member.

11. The method of claim 10 wherein the outwardly projecting guide member is a generally u-shaped member for guiding the battery pack into a nested position in the cradle of the housing of the transceiver by extending into a cavity in the housing of the portable transceiver, said u-shaped member extending in a direction generally orthogonal to said planar surface.

12. The method of claim 11 wherein the latch member is a cantilevered retention snap member having a catch surface for securing the battery pack in the portable transceiver, said snap member being engaged when said catch surface butts against a stop surface in said cavity.

13. The method of claim 12 further including the step of inserting the first elongated protrusion in an alignment opening in the housing of the portable transceiver.

14. The method of claim 13 wherein said at least two openings respectively engage a second and a third elongated protrusion, said second and third elongated protrusion being located on an upstanding surface in the cradle of the housing of the portable transceiver, and said first elongated protrusion having a length greater than said second and third elongated protrusion.

15. The method of claim 14 wherein the snap member, said at least two openings and said first elongated protrusion provides the total restraint for securing the battery housing in the housing of the portable transceiver.

* * * * *